Patented Aug. 6, 1929.                                                           1,723,814

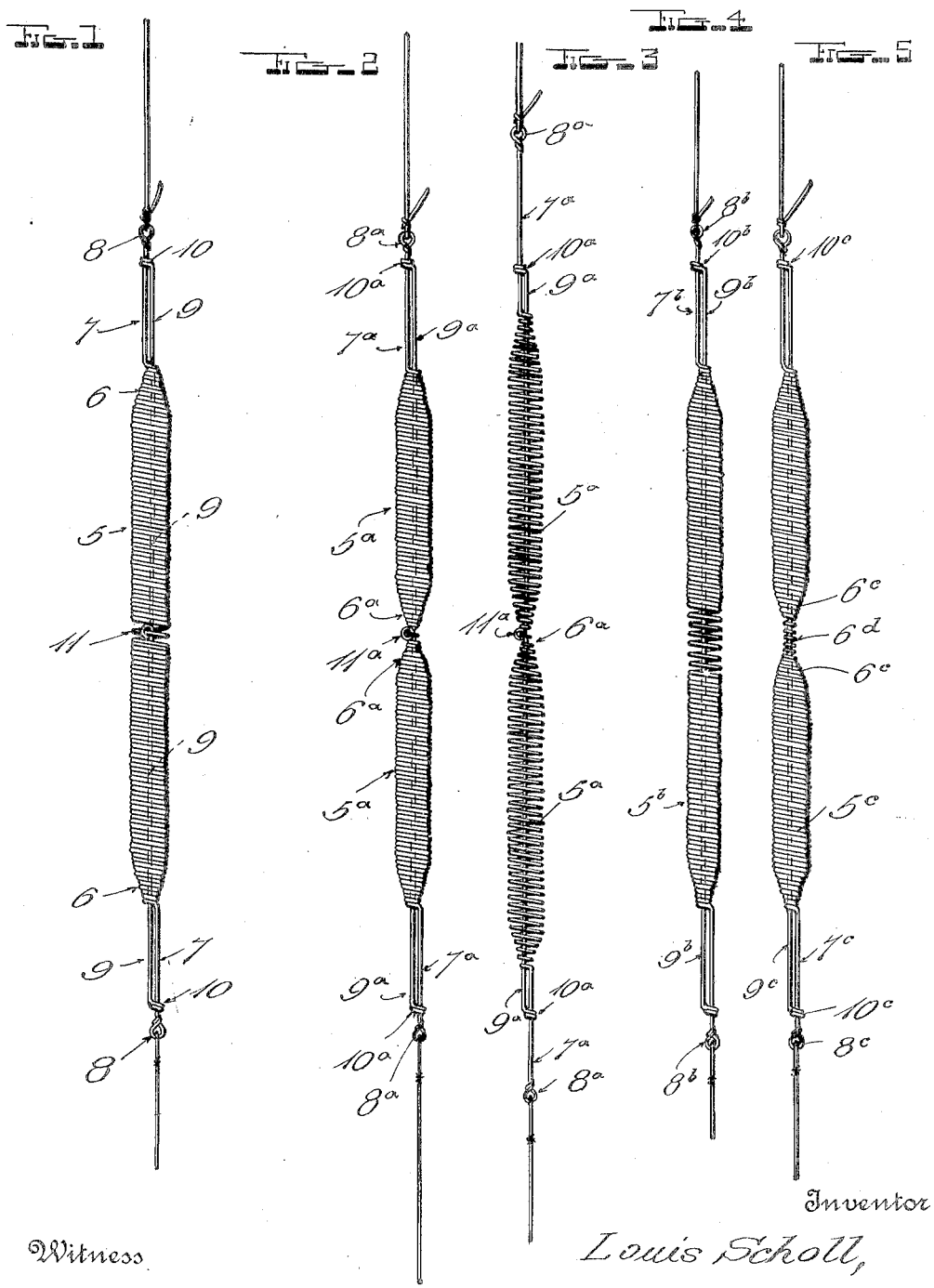

UNITED STATES PATENT OFFICE.

LOUIS SCHOLL, OF WASCO, OREGON.

FISH SNUBBER.

Application filed April 23, 1928. Serial No. 272,335.

This invention relates to improvements in fish snubbers.

One object of the invention is to provide a device of this character adapted to be interposed in fishing lines whereby a yielding resistance to the pull of a hooked fish is provided, thereby preventing the fish from tearing itself loose from the hook and escaping.

Another object is to provide a snubber attachment for fishing lines having an improved stop device for limiting the stretch of the snubber spring so that the same will not be pulled out of shape or broken by a sudden lunge of a large fish or by the fouling of the hook.

Another object is to provide a device of the character described which will also act as a light sinker for the fishing line and which may be constructed in a single or double form.

With the foregoing in view the invention resides in the novel subject matter hereinafter described and claimed, the description being supplemented by the accompanying drawing.

Figure 1 is a side view of one form of my improved fish snubber.

Fig. 2 is a similar view of another form thereof.

Fig. 3 is a similar view of the form of the snubber disclosed in Fig. 2 showing the spring sections stretched.

Figs. 4 and 5 are side views of still other modified forms of the device.

In Fig. 1 of the drawing is shown the preferred form of the invention which consists of a relatively light coiled spring 5 which may be of any suitable diameter and length. The coils of the spring at each end thereof are tapered or gradually decreased in size as shown at 6 to form centrally disposed tapered guide passages. The ends of the wire from which the spring is formed, after forming the last or end coils are extended for a short distance beyond the ends of the spring as shown at 7 and on said extended ends are formed eyes 8 to which are connected the ends of the sections of the fishing line in which the snubber is interposed.

Extending through and projecting a suitable distance beyond the ends of the spring is a stop rod 9 which is preferably formed from a larger gage of wire than that from which the spring 5 is formed. The extremities of the projecting ends of the stop rod are bent at right angles and then coiled to form offset guide eyes 10 with which the extended ends 7 of the spring are slidably engaged. These offset guide eyes 10 also form stops with which the ends of the spring 5 come into engagement when the spring has been stretched to its full capacity. When the ends of the spring are thus engaged with the stops further pull on the spring will be arrested and the pull or strain will then be shifted to the stop rod, as will be readily understood. Midway between the ends of the stop rod 9 and at the cental portion of the spring 5, said rod is bent into the form of an eye or loop 11 which is engaged with or looped around the central coil of the spring, as shown. By thus connecting the stop rod with the central or middle coil of the spring the same is separated into two independent sections, each of which will pull outwardly from its anchorage in the eye or loop 11 of the stop rod, separately and independently from the other. This structure and arrangement tends to steady the action of the spring.

The structure and arrangement of the snubber as shown in Figs 2 and 3 is the same as that shown in Fig. 1 except that in each of the spring sections 5ª shown in these figures, the coils at their inner ends are tapered or gradually decreased in size to the meeting point or juncture of the sections as shown at 6ª and the loop or eye 11ª of the stop rod 9ª is engaged with one of the reduced coils at the inner ends of these tapered portions as shown. The stop rod 9ª in this form of the invention has on its ends right angular offset guide eyes and stops 10ª with which the extended ends 7ª of the spring sections are slidably engaged and these extended ends of the spring sections have line attaching loops 8ª.

In Fig. 4 of the drawing the snubber is shown in the form of a continuous spring 5ᵇ, the coils of which are of uniform size except at the ends of the spring where they taper as in the other forms of the device. In this last described form of the snubber the stop rod 9ᵇ extends straight through the spring and has no connection with the coils thereof. The outer ends of this stop rod 9ᵇ are provided with offset guide eyes and stops 10ᵇ which receive the extended ends 7ᵇ of the spring the same as in the other views and these extended ends of the spring have line attaching eyes 8ᵇ.

In the form of the snubber shown in Fig. 5 the coils of the spring 5ᶜ midway between its ends are tapered toward the center as at 6ᶜ and between these tapered portions are a number of reduced coils 6ᵈ forming a central guide passage. The stop rod 9ᶜ of this last described form of the device extends straight through the spring as in Fig. 4 and is centered in the spring by the guide passage formed by the reduced coils 6ᵈ. The outer ends of this stop rod 9ᶜ are provided with combined guide lugs and stops 10ᶜ with which the extended ends 7ᶜ of the spring are slidably engaged, said extended ends of the spring having line attaching eyes 8ᶜ.

This improved snubber may be interposed at any desired place in the fishing line either ahead of or behind the spoon when used in trolling lines. The snubber will also serve the purpose of a light sinker.

From the foregoing it will be seen that in the use of my improved snubber, the possibility of a hooked fish tearing itself loose is greatly reduced and a large percentage of hooked fish may be landed which would have otherwise escaped. It will also be seen that in limiting the stretch of the spring by my improved stop rod the spring will be relieved of excessive strain resulting from efforts to free a hook which may have become fouled in grass or caught in some other manner or from sudden or heavy jerks from a large fish.

I claim:

1. A fish snubber comprising a coil spring adapted to be interposed in a fishing line, the ends of said spring being extended and provided with eyes to which sections of the line are attached, a stop rod extending through said spring and having its ends projecting beyond the ends of the spring and offset guide eyes on the projecting ends of the rod to slidably receive said extended ends of the spring, said offset eyes also forming stops for limiting the stretch of the spring in both directions.

2. A structure as specified in claim 1, wherein the coils of the spring at its ends are tapered to form centrally disposed guide passages for said stop rod.

3. A structure as specified in claim 1, wherein said stop rod is secured between its ends to one of the coils of said spring between the ends thereof.

4. A structure as specified in claim 1, wherein said stop rod is bent midway between its ends to form an eye, said eye being engaged with one of the coils of said spring midway between the ends thereof.

In testimony whereof I have hereunto affixed my signature.

LOUIS SCHOLL.